UNITED STATES PATENT OFFICE.

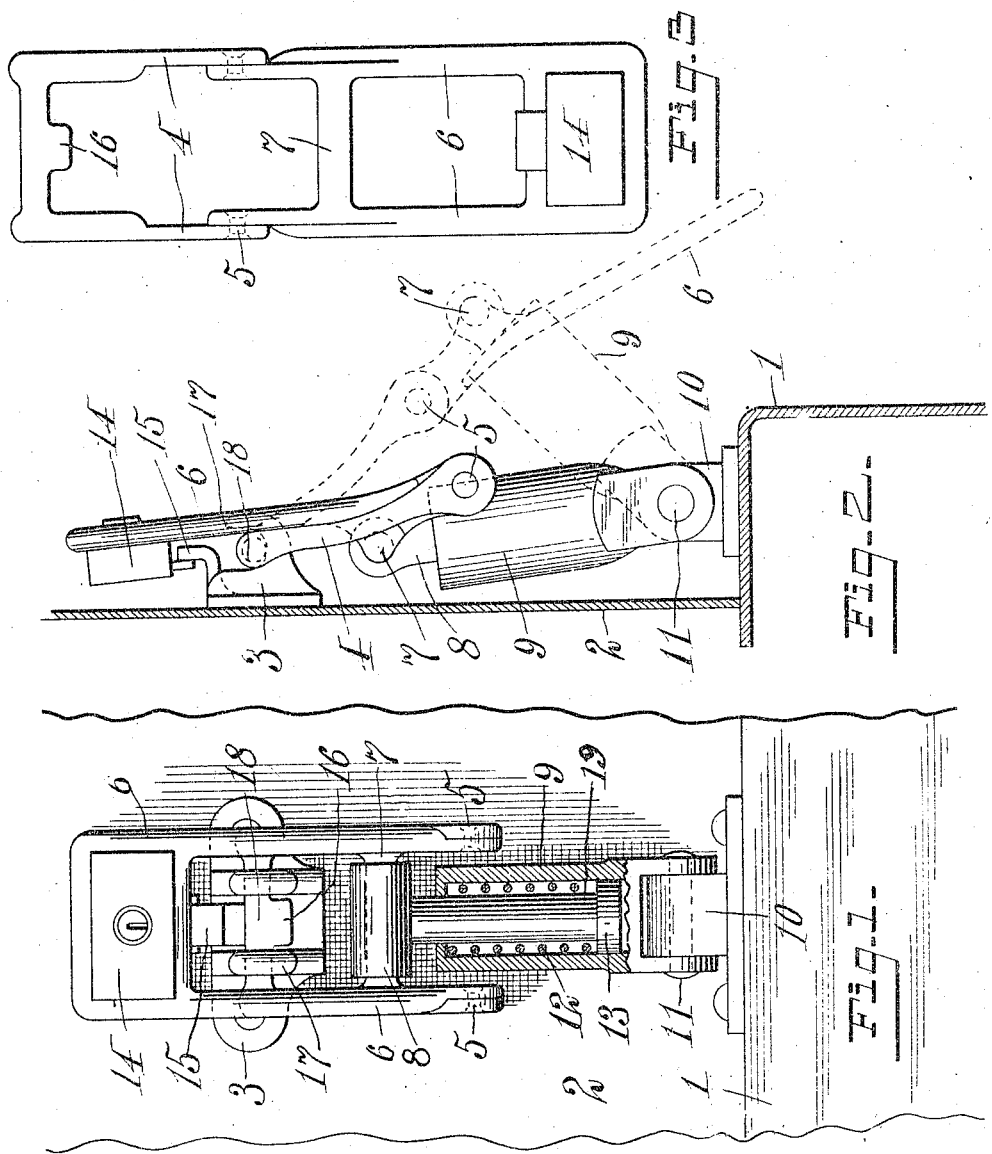

CLARK L. DORNEY, OF DAYTON, OHIO, ASSIGNOR OF ONE-HALF TO JOS. E. SELLS, OF DAYTON, OHIO.

HOOD AND DRIP-PAN FASTENER.

1,062,229.　　　　Specification of Letters Patent.　　Patented May 20, 1913.

Application filed December 30, 1912. Serial No. 739,198.

*To all whom it may concern:*

Be it known that I, CLARK L. DORNEY, a citizen of the United States, residing at Dayton, in the county of Montgomery and State of Ohio, have invented certain new and useful Improvements in Hood and Drip-Pan Fasteners; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in fastening devices for the hoods and drip pans of automobiles.

The object of the invention is to provide a device of this type which is simple in construction and efficient in operation and which will automatically tighten the hood and drip pan to the frame thereby preventing the same rattling.

Referring to the drawings, Figure 1 is a front elevation of the device partially in section; Fig. 2 is a side elevation, and Fig. 3 is a plan view of the levers.

Referring more particularly to the drawings, 1 represents the side frame of an automobile upon which rests a hood 2 which is a well known part of an automobile. The hood is secured to the frame 1 by the following device: Attached to the hood 2 is a member 3 provided with two hooked extensions 17 which are adapted to receive a yoke 18 of a double armed link 4 joined at one end. The yoke 18 is provided with a projection 16, which rests between the hooked extensions 17, thereby holding the link central. The double arm link 4 is pivoted at 5 to one end of a double arm lever 6. The lever 6 is provided with a cross pivot 7 intermediate of its length. The pivot 7 is journaled in the upper end or cross-head 8 of a plunger 19 mounted in a cylinder 9 and when so connected, the space between the two arms of the lever 6 is so occupied by the cross-head 8 that any looseness or lateral movement of the said lever is prevented. Likewise, any lateral movement of the link 4 is prevented by reason of the fact that the lever 6 is prevented from moving laterally on its pivotal connection with the cross-head of the plunger. The plunger 19 is provided with a lower head 13, and mounted between the head 13 and the top of the cylinder 9 is a spring 12 which exerts a downward influence on the plunger 19 and parts carried thereby. The cylinder 9 is pivoted at 11 to a member 10 attached to the frame 2. When the lever 6 is thrown down and the cylinder 9 is swung on its pivot 11, as is shown in dotted lines in Fig. 2, the link 4 may be released from engagement with the hooked extensions 17, thus permitting the hood 2 to be removed. When the yoke 18 is in engagement with the hooks 17 and the lever 6 is placed in an upper position, the spring 12 will hold the hood 2 securely against the frame 1 thereby preventing the parts rattling. The spring 12 will also hold the lever 6 in an elevated position, as the pivot 7 lies past a line drawn through the axes of the yoke 18 and the pivot 11, when the lever 6 is elevated. As the link 4 and lever 6 are made double the arms thereof are permitted to lie on opposite sides of the axes of the spring 12 and cylinder 9 thereby equalizing the strain imparted by the spring. To prevent the lever 6 being lowered by unauthorized persons, the lever 6 may be provided with a lock 14 which coöperates with a projection 15 extending from the member 3 to lock the hood when the lever 6 is in an elevated position.

While in the drawings and in the above description, I have shown and described the device as adapted to secure the hood of an automobile, it is to be understood, that, by inverting the device and attaching the same to the under side of the frame 1, the device may be used to secure the drip pan of the automobile.

Having described my invention, I claim,

In a device of the type specified, a pivotally mounted cylinder, a spring-controlled plunger in said cylinder, said plunger having its upper exposed end terminated in a cross-head, a double arm lever pivotally connected to the cross-head of said plunger, said pivot lying on one side of the plane of the lever arms, and the space between said lever arms being occupied by the said cross-head, a double arm link pivotally connected to the ends of the lever arms the upper ends of said double arm link being joined by a cross-bar, and a double hook member adapted to engage the cross-bar of said link to hold the same while the double arm lever is being thrown upwardly on the pivots which connect said lever with the cross-head of the plunger and with said link, and to hold said link after tension is applied to the spring, in the operation of said lever, substantially as specified.

In testimony whereof I affix my signature, in presence of two witnesses.

CLARK L. DORNEY.

Witnesses:
JOSEPH E. SELLS,
CHAS. H. RIGLER.